United States Patent
Teraoka

(10) Patent No.: US 9,952,414 B2
(45) Date of Patent: Apr. 24, 2018

(54) CAMERA LENS

(71) Applicant: Hiroyuki Teraoka, Shenzhen (CN)

(72) Inventor: Hiroyuki Teraoka, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/415,917

(22) Filed: Jan. 26, 2017

(65) Prior Publication Data
US 2018/0024324 A1    Jan. 25, 2018

(30) Foreign Application Priority Data
Jul. 19, 2016    (JP) .................... 2016-141165

(51) Int. Cl.
| | |
|---|---|
| G02B 3/02 | (2006.01) |
| G02B 13/18 | (2006.01) |
| G02B 13/00 | (2006.01) |
| G02B 9/62 | (2006.01) |

(52) U.S. Cl.
CPC .......... *G02B 13/0045* (2013.01); *G02B 9/62* (2013.01)

(58) Field of Classification Search
CPC .. G02B 13/00; G02B 13/0015; G02B 13/002; G02B 13/0045; G02B 13/009
USPC ........................................ 359/708, 713, 714
See application file for complete search history.

(56) References Cited

U.S. PATENT DOCUMENTS

2017/0235111 A1*    8/2017 Hashimoto ........ G02B 13/0045
                                                                    359/713

* cited by examiner

*Primary Examiner* — Robert E Tallman
(74) *Attorney, Agent, or Firm* — Na Xu; IPro, PLLC

(57) ABSTRACT

A camera lens is disclosed. The camera lens includes a first lens with positive refractive power; a second lens with negative refractive power; a third lens with negative refractive power; a fourth lens with positive refractive power; a fifth lens with negative refractive power; and a sixth lens with negative refractive power. The camera lens further satisfies specific conditions.

5 Claims, 5 Drawing Sheets

CAMERA LENS

TECHNICAL FIELD

The present disclosure relates to the technical field of optical elements, and more particularly to a camera lens used in a portable device.

RELATED ART OF THE PRESENT DISCLOSURE

The present invention relates to a camera lens. Particularly it relates to a camera lens very suitable for mobile phone camera module and WEB camera lens etc. equipped with high-pixel camera elements such as CCD, CMOS etc. The camera lens of the invention is composed of six piece total angle of view, narrow angle below 50°, and small sized lens with excellent optical properties.

In recent years, various camera devices equipped with camera elements such as CCD, CMOS are extensively popular. Along with development on camera lens toward miniaturization and high performance, narrow angle and small sized camera lenses with excellent optical properties are needed in society.

The technology related to the camera lens composed of six piece small sized lenses with excellent optical properties is developed gradually. The camera lens mentioned in the proposal is composed of six piece lenses which are arranged sequentially from object side as follows: a first lens with positive refractive power; a second lens with negative refractive power; a third lens with negative refractive power; a fourth lens with positive refractive power and a fifth lens with negative refractive power; a sixth lens with negative refractive power The camera lens disclosed in embodiment 1 of the prior Japanese Patent Publication No. 2015-175876 is composed of the above mentioned six piece lenses, but refractive power distribution of the first lens is insufficient and shape of the fourth lens is improper; 2ω=83.4° so it is wide angle.

The camera lens disclosed in embodiment 6 of the prior Japanese Patent Publication No. 2015-121730 is composed of the above mentioned six piece lenses, but refractive power distribution of the first lens is insufficient and shape of the fourth lens is improper; 2ω=74.0° so it is wide angle.

Therefore, it is necessary to provide an improved camera lens to overcome the disadvantages mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby are only to explain this disclosure, not intended to limit this disclosure.

Figure 1:
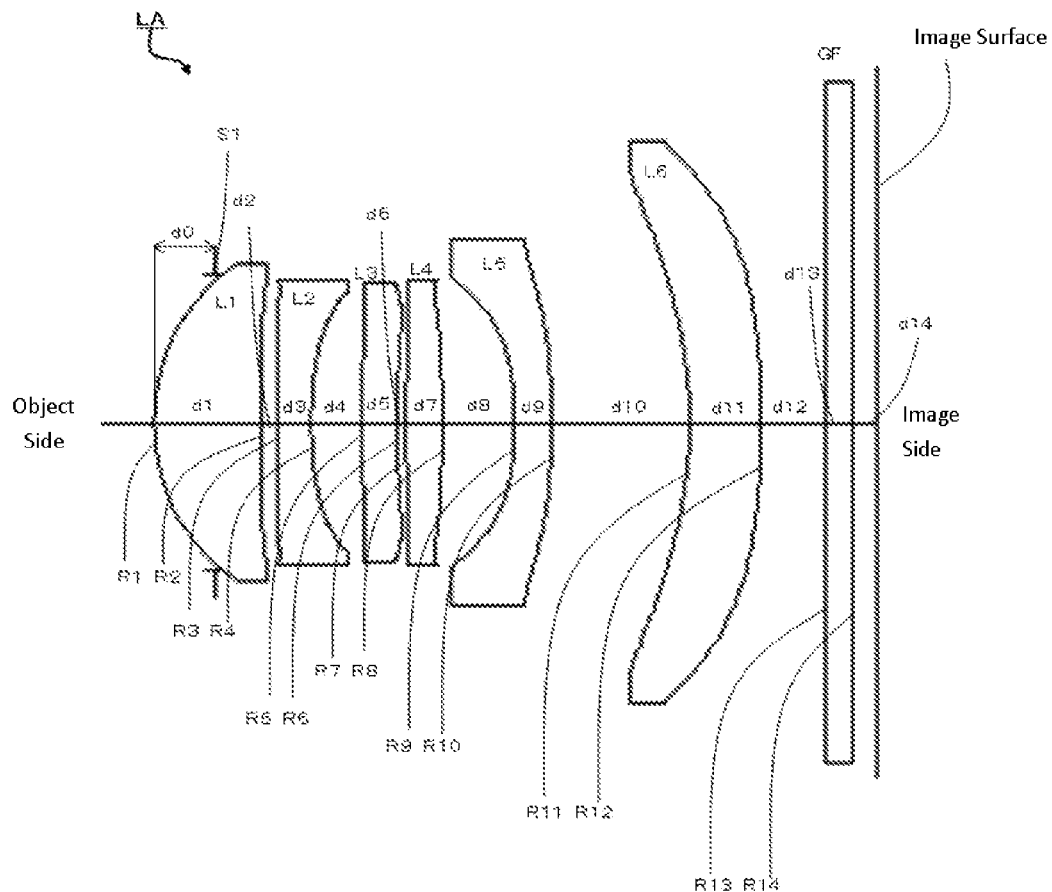
FIG. 1 is a structure diagram of a camera lens LA related to one embodiment of the present disclosure.

FIG. 1 is the structure diagram of a camera lens LA related to an embodiment of the present disclosure. The camera lens LA is composed of six piece lenses which are arranged sequentially from object side to the imaging surface including a first lens L1, a second lens L2, a third lens L3, a fourth lens L4, a fifth lens L5 and a sixth lens L6. A glass plate GF is arranged between the sixth lens L6 and the imaging surface. And a glass cover or an optical filter having the function of filtering IR can be taken as the glass plate GF. Moreover, it shall be fine if no glass plate GF is arranged between the sixth lens L6 and the imaging surface.

The first lens L1 has positive refractive power; the second lens L2 has negative refractive power; the third lens L3 has negative refractive power; the fourth lens L4 has positive refractive power; the fifth lens L5 has negative refractive power, the sixth lens has negative refractive power. Moreover, the surfaces of the six piece lenses should be designed as the aspheric shape preferably in order to correct the aberration well.

A camera lens is characterized in that the camera lens meets following condition (1)~(2):

$$0.35 \leq f1/f \leq 0.50 \qquad (1)$$

$$-1.00 \leq (R7+R8)/(R7-R8) \leq -0.10 \qquad (2)$$

where, f: overall focal distance of the camera lens
f1: focal distance of the first lens
R7: curvature radius of the fourth lens' object side surface
R8: curvature radius of the fourth lens' image side surface The positive refractive power of the first lens L1 is specified in the condition (1). It is useful for development of small sized trend when the numerical range exceeds the lower limit specified in the condition (1); however, the aberration cannot be corrected easily because the positive refractive power of the first lens L1 becomes too strong; on the contrary, when the numerical range exceeds the upper limit specified, the development of small sized trend cannot be implemented easily because the refractive power of the first lens L1 becomes too weak.

Therefore, numerical range of condition (1) should be set within the numerical range of the following condition (1-A) preferably, $$0.42 \leq f1/f \leq 0.46 \qquad (1\text{-}A)$$

The shape of the fourth lens L4 is specified in the condition (2). When it is outside the range of condition (2), 2ω≤50°, it is hard to have excellent optical properties.

Therefore, numerical range of condition (2) should be set within the numerical range of the following condition (2-A) preferably, $$-0.50 \leq (R7+R8)/(R7-R8) \leq -0.13 \quad (2\text{-}A)$$

The second lens L2 has negative refractive power and meets the following condition (3).

$$-1.00 \leq f2/f \leq -0.50 \quad (3)$$

where,
f: overall focal distance of the camera lens
f2: focal distance of the second lens Negative refractive power of the second lens L2 is specified in the condition (3). When it is outside the range of condition (3), $2\omega \leq 50°$, correction of chromatic aberration on axle and outside axle cannot be implemented easily.

Therefore, numerical range of condition (3) should be set within the numerical range of the following condition (3-A) preferably, $$-0.80 \leq f2/f \leq -0.60 \quad (3\text{-}A)$$

The third lens L3 has negative refractive power and meets the following condition (4).

$$-10.00 \leq f3/f \leq -2.00 \quad (4)$$

where,
f: overall focal distance of the camera lens
f3: focal distance of the third lens The negative refractive power of the third lens L3 is specified in the condition (4). When it is outside the range of condition (4), $2\omega \leq 50°$, correction of chromatic aberration outside axle cannot be implemented easily.

Therefore, numerical range of condition (4) should be set within the numerical range of the following condition (4-A) preferably, $$-8.00 \leq f3/f \leq -3.00 \quad (4\text{-}A)$$

The first lens L1 has positive refractive power and meets the following condition (5).

$$-1.00 \leq (R1+R2)/(R1-R2) \leq -0.80 \quad (5)$$

where,
R1: curvature radius of the first lens' object side surface
R2: curvature radius of the first lens' image side surface The shape of the first lens L1 is specified in the condition (5). When it is outside the range of condition (5), $2\omega \leq 50°$, development of small sized trend cannot be implemented easily.

Therefore, numerical range of condition (5) should be set within the numerical range of the following condition (5-A) preferably, $$-0.95 \leq (R1+R2)/(R1-R2) \leq -0.88 \quad (5\text{-}A)$$

The sixth lens L6 has negative refractive power and meets the following condition (6).

$$-4.00 \leq (R11+R12)/(R11-R12) \leq -1.00 \quad (6)$$

where,
R11: curvature radius of the sixth lens' object side surface
R12: curvature radius of the sixth lens' image side surface The shape of the sixth lens L6 is specified in the condition (6). When it is outside the range of condition (6), $2\omega \leq 50°$ incident angle of main light toward imaging surface (hereinafter referred to as CRA) cannot increase easily Therefore, numerical range of condition (6) should be set within the numerical range of the following condition (6-A) preferably, $$-3.20 \leq (R11+R12)/(R11-R12) \leq -2.00 \quad (6\text{-}A)$$

Because six piece lenses of camera Lens LA all have the stated formation and meet all the conditions, so it is possible to produce a small sized and $2\omega \leq 50°$ narrow angle camera lens with excellent optical properties.

The camera lens LA of the invention shall be explained below by using the embodiments. Moreover, the symbols used in all embodiments are shown as follows. And mm shall be taken as the unit of the distance, the radius and the center thickness.

f: overall focal distance of the camera lens LA
f1: focal distance of the first lens L1
f2: focal distance of the second lens L2
f3: focal distance of the third lens L3
f4: focal distance of the fourth lens L4
f5: focal distance of the fifth lens L5
f6: focal distance of the sixth lens L6
Fno: F Value
$2\omega$: total angle of view
CRA: incident angle of main light toward imaging surface
S1: Open aperture
R: curvature radius of optical surface, if a lens is involved it is central curvature radius
R1: curvature radius of the first lens L1's object side surface
R2: curvature radius of the first lens L1's image side surface
R3: curvature radius of the second lens L2's object side surface
R4: curvature radius of the second lens L2's image side surface
R5: curvature radius of the third lens L3's object side surface
R6: curvature radius of the third lens L3's image side surface
R7: curvature radius of the fourth lens L4's object side surface
R8: curvature radius of the fourth lens L4's image side surface
R9: curvature radius of the fifth lens L5's object side surface
R10: curvature radius of the fifth lens L5's image side surface
R11: curvature radius of the sixth lens L6's object side surface
R12: curvature radius of the sixth lens L6's image side surface
R13: curvature radius of the glass plate GF's object side surface
R14: curvature radius of the glass plate GF's image side surface
d: center thickness of lenses or the distance between lenses
d0: axial distance from open aperture S1 to object side surface of the first lens L1
d1: center thickness of the first lens L1
d2: axial distance from image side surface of the first lens L1 to object side surface of the second lens L2
d3: center thickness of the second lens L2
d4: axial distance from image side surface of the second lens L2 to object side surface of the third lens L3
d5: center thickness of the third lens L3
d6: axial distance from image side surface of the third lens L3 to object side surface of the fourth lens L4
d7: center thickness of the fourth lens L4
d8: axial distance from image side surface of the fourth lens L4 to object side surface of the fifth lens L5
d9: center thickness of the fifth lens L5
d10: axial distance from image side surface of the fifth lens L5 to object side surface of the sixth lens L6
d11: center thickness of the sixth lens L6
d12: axial distance from image side surface of the sixth lens L6 to object side surface of the glass plate GF
d13: center thickness of glass plate GF
d14: axial distance from image side surface to imaging surface of the glass plate GF
nd: refractive power of line d
nd1: refractive power the first lens L1's line d nd2: refractive power the second lens L2's line d
nd3: refractive power the third lens L3's line d
nd4: refractive power the fourth lens L4's line d
nd5: refractive power the fifth lens L5's line d
nd6: refractive power the sixth lens L6's line d
nd7: refractive power the glass plate GF's line d
vd: abbe number
  v1: abbe number of the first lens L1
  v2: abbe number of the second lens L2
  v3: abbe number of the third lens L3
  v4: abbe number of the fourth lens L4
  v5: abbe number of the fifth lens L5
  v6: abbe number of the sixth lens L6
  v6: abbe number of the glass plate GF
TTL: optical length (axial distance from object side surface to the imaging surface of the first lens L1)
LB: axial distance (including thickness of the glass plate GF) from the image side surface to the imaging surface of the sixth lens L6;

$$y=(x2/R)/[1+\{1-(k+1)(x2/R2)\}^{1/2}]+A4x4+A6x6+A8x8+A10x10+A12x12+A14x14+A16x16 \quad (7)$$

where, R is axial curvature radius, k is cone coefficient, A4, A6, A8, A10, A12, A14, A16 are aspheric coefficients.

For convenience sake, the aspheric surface shown in the formula (7) shall be taken as the aspheric surfaces of all lens' surfaces. However, the invention shall not be limited to polynomial form of the aspheric surface shown in the formula (7).

Embodiment 1

Figure 2:
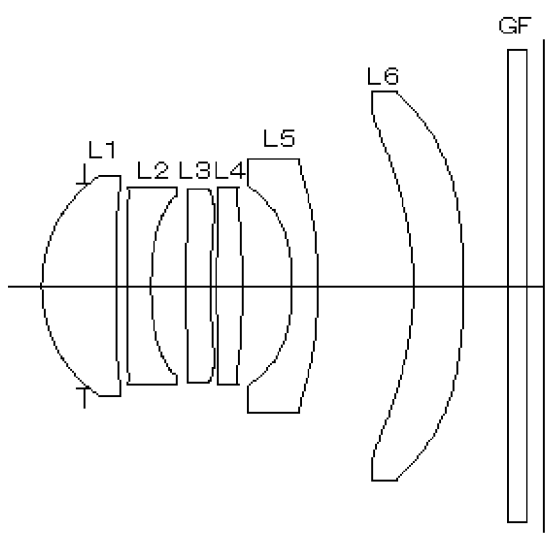
FIG. 2 is a structure diagram of the definite Embodiment 1 of the above-mentioned camera lens LA.

FIG. 2 is the structure of camera lens LA in Embodiment 1. Data shown in Table 1: curvature radius R of the object side surfaces and the image side surfaces, center thicknesses of the lenses, distances d among the lenses, refractive powers nd and abbe numbers of the lens L1~L6 in the Embodiment 1, wherein the camera lens LA is formed by the lens L1~L6; Data shown in Table 2: conical coefficients k and aspheric coefficients

TABLE 1

| | R | d | nd | v d |
|---|---|---|---|---|
| S1 | ∞ | d0 = −0.450 | | |
| R1 | 1.46653 | d1 = 0.807 | nd1 1.5441 | v 1 56.12 |
| R2 | −36.23577 | d2 = 0.112 | | |
| R3 | −13.20291 | d3 = 0.252 | nd2 1.6614 | v 2 20.41 |
| R4 | 3.27080 | d4 = 0.376 | | |
| R5 | 11.24906 | d5 = 0.260 | nd3 1.5441 | v 3 56.12 |

TABLE 1-continued

| | R | d | nd | v d |
|---|---|---|---|---|
| R6 | 6.05696 | d6 = 0.068 | | |
| R7 | 8.99571 | d7 = 0.271 | nd4 1.6614 | v 4 20.41 |
| R8 | −16.84601 | d8 = 0.540 | | |
| R9 | −2.87062 | d9 = 0.274 | nd5 1.5441 | v 5 56.12 |
| R10 | −7.30957 | d10 = 1.029 | | |
| R11 | −3.43403 | d11 = 0.532 | nd6 1.5441 | v 6 56.12 |
| R12 | −8.01817 | d12 = 0.480 | | |
| R13 | ∞ | d13 = 0.210 | nd7 1.5168 | v 7 64.17 |
| R14 | ∞ | d14 = 0.169 | | |

TABLE 2

| | conical coefficient | aspheric coefficient | | | | | | |
|---|---|---|---|---|---|---|---|---|
| | k | A4 | A6 | A8 | A10 | A12 | A14 | A16 |
| R1 | 3.8797E−02 | −8.6349E−03 | 1.8872E−02 | −3.1907E−02 | 2.4884E−02 | −5.1492E−03 | −2.5306E−03 | 2.3164E−03 |
| R2 | 0.0000E+00 | 1.4395E−02 | 2.0032E−03 | 4.1725E−02 | −2.1366E−02 | 4.5550E−03 | 2.8987E−04 | −6.8014E−03 |
| R3 | 0.0000E+00 | 4.4815E−02 | 2.3098E−02 | 2.0637E−02 | −2.1764E−03 | −2.0084E−02 | −2.8682E−02 | 1.3827E−02 |
| R4 | 1.0616E+01 | 3.3679E−02 | 4.4085E−02 | 2.0240E−02 | −7.4655E−02 | −1.4336E−02 | 5.9695E−02 | −8.9665E−02 |
| R5 | 0.0000E+00 | 1.8504E−03 | −2.0517E−02 | −7.4434E−03 | 0.0000E+00 | 0.0000E+00 | 0.0000E+00 | 0.0000E+00 |
| R6 | 0.0000E+00 | −4.5186E−03 | −1.8754E−02 | −5.9149E−02 | 0.0000E+00 | 0.0000E+00 | 0.0000E+00 | 0.0000E+00 |
| R7 | 0.0000E+00 | −2.9244E−02 | 2.0252E−02 | −1.7633E−02 | −1.8032E−02 | −3.2755E−02 | 5.0924E−03 | 2.6892E−02 |
| R8 | −3.7089E+02 | −6.0421E−02 | 1.8380E−02 | −1.4875E−03 | 6.1141E−02 | −2.7073E−02 | −1.9848E−01 | 1.7189E−01 |
| R9 | 2.8150E+00 | −1.5703E−01 | −7.1453E−03 | −1.5679E−02 | −1.3447E−02 | −3.6254E−03 | −6.0916E−02 | 7.1271E−02 |
| R10 | 1.1305E+01 | −6.3317E−02 | 3.4117E−02 | −2.3385E−02 | 7.3229E−03 | 2.3969E−03 | 1.4991E−03 | −1.0770E−03 |
| R11 | 0.0000E+00 | 1.6235E−05 | 7.0843E−03 | −1.3120E−03 | −5.8744E−04 | 1.0556E−04 | 5.2411E−05 | −9.4666E−06 |
| R12 | 1.3121E+00 | −2.7254E−02 | 4.6027E−03 | −1.8396E−03 | 4.1932E−04 | −4.1434E−05 | −1.6463E−05 | 3.7041E−06 |

The values in embodiment 1 and 2 and the values corresponding to the parameters specified in the conditions (1)-6 are shown in subsequent Table 5.

As shown in Table 5, the Embodiment 1 meets the conditions (1)~(6).

Figure 3:
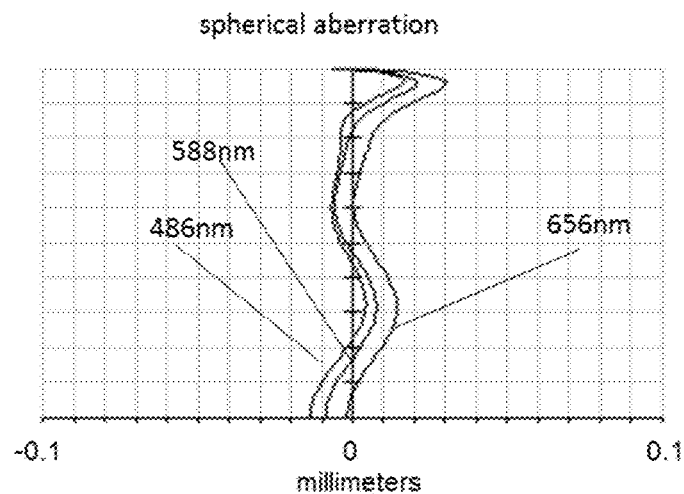
FIG. 3 is a spherical aberration diagram of the camera lens LA in Embodiment 1.
Figure 4:
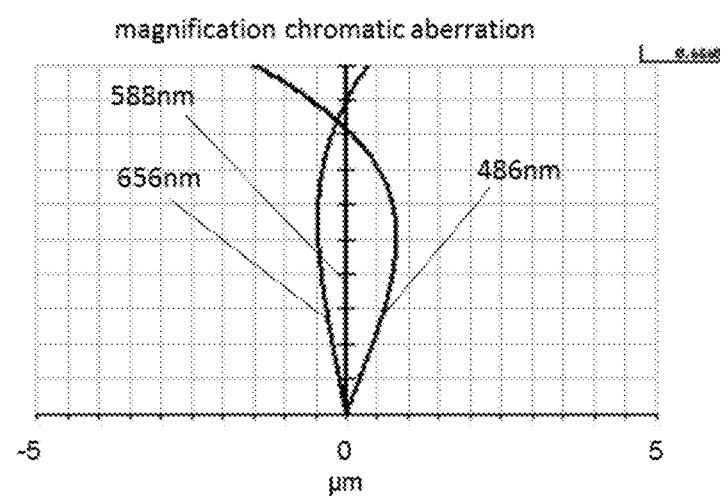
FIG. 4 is a magnification chromatic aberration diagram of the camera lens LA in Embodiment 1.
Figure 5:
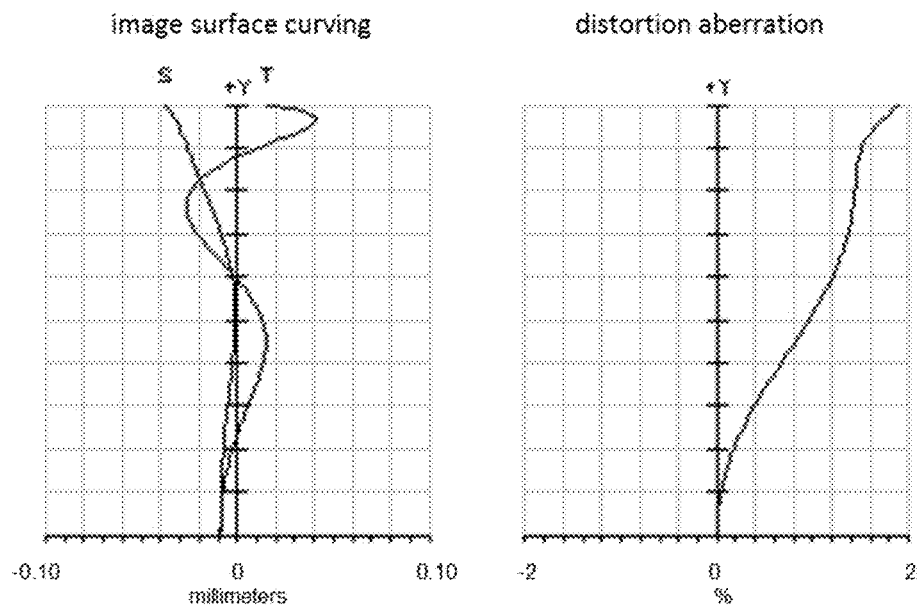
FIG. 5 is an image surface curving diagram and distortion aberration diagram of the camera lens LA in Embodiment 1.

Spherical aberration of camera lens LA in embodiment 1 is shown in FIG. 3, magnification chromatic aberration of the same is shown in FIG. 4, image surface curving and distortion aberration of the same is shown in FIG. 5. Furthermore, image surface curving S in FIG. 5 is the one opposite to the sagittal image surface, T is the one opposite to the tangent image surface. Same applies for the Embodiment 2. As shown in FIG. 3-5, the camera lens LA in embodiment 1 has the properties, 2ω=47.5°, TTL=5.380 mm camera lens is small sized and narrow angle camera lens, it is not difficult to understand why it has excellent optical properties.

Embodiment 2

Figure 6:
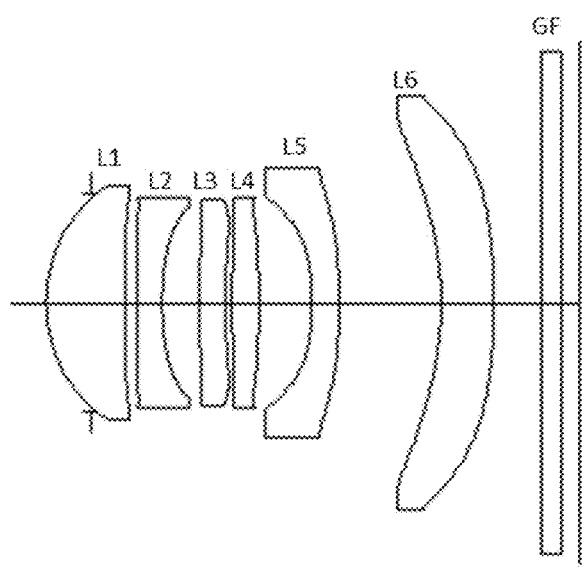
FIG. 6 is a structure diagram of the definite Embodiment 2 of the above-mentioned camera lens LA.

FIG. 6 is the structure of camera lens LA in Embodiment 2. Data shown in Table 3: curvature radius R of the object side surfaces and the image side surfaces, center thicknesses of the lenses, distances d among the lenses, refractive powers nd and abbe numbers of the lens L1~L6 in the Embodiment 2, wherein the camera lens LA is formed by the lens L1~L6; Data shown in Table 4: conical coefficients k and aspheric coefficients.

TABLE 3

| | R | d | nd | v d |
|---|---|---|---|---|
| S1 | ∞ | d0 = −0.450 | | |
| R1 | 1.46974 | d1 = 0.810 | nd1 1.5441 | v 1 56.12 |
| R2 | −34.31642 | d2 = 0.114 | | |
| R3 | −13.21482 | d3 = 0.253 | nd2 1.6614 | v 2 20.41 |
| R4 | 3.27387 | d4 = 0.373 | | |

TABLE 3-continued

| | R | d | | nd | | v d | |
|---|---|---|---|---|---|---|---|
| R5 | 10.92318 | d5 = | 0.264 | nd3 | 1.5441 | v 3 | 56.12 |
| R6 | 5.96396 | d6 = | 0.065 | | | | |
| R7 | 8.96335 | d7 = | 0.273 | nd4 | 1.6510 | v 4 | 21.51 |
| R8 | −16.91035 | d8 = | 0.540 | | | | |
| R9 | −2.87313 | d9 = | 0.272 | nd5 | 1.5441 | v 5 | 56.12 |
| R10 | −7.33145 | d10 = | 1.031 | | | | |
| R11 | −3.45705 | d11 = | 0.519 | nd6 | 1.5441 | v 6 | 56.12 |
| R12 | −8.13963 | d12 = | 0.480 | | | | |
| R13 | ∞ | d13 = | 0.210 | nd7 | 1.5168 | v 7 | 64.17 |
| R14 | ∞ | d14 = | 0.169 | | | | |

TABLE 4

| | conical coefficient | aspheric coefficient | | | | | | |
|---|---|---|---|---|---|---|---|---|
| | k | A4 | A6 | A8 | A10 | A12 | A14 | A16 |
| R1 | 3.6206E−02 | −7.8902E−03 | 1.7961E−02 | −3.1925E−02 | 2.4935E−02 | −5.1548E−03 | −2.5779E−03 | 2.2510E−03 |
| R2 | 0.0000E+00 | 1.3927E−02 | 1.7007E−03 | 4.1313E−02 | −2.1565E−02 | 4.5652E−03 | 4.3408E−04 | −6.5933E−03 |
| R3 | 0.0000E+00 | 4.5219E−02 | 2.3590E−02 | 2.1427E−02 | −1.6792E−03 | −1.9994E−02 | −2.8926E−02 | 1.3373E−02 |
| R4 | 1.0568E+01 | 3.4016E−02 | 4.7020E−02 | 1.7544E−02 | −7.7987E−02 | −1.4696E−02 | 6.4300E−02 | −8.0303E−02 |
| R5 | 0.0000E+00 | 1.6427E−03 | −2.3412E−02 | −8.8777E−03 | 0.0000E+00 | 0.0000E+00 | 0.0000E+00 | 0.0000E+00 |
| R6 | 0.0000E+00 | −4.0791E−03 | −1.6708E−02 | −6.0612E−02 | 0.0000E+00 | 0.0000E+00 | 0.0000E+00 | 0.0000E+00 |
| R7 | 0.0000E+00 | −2.9686E−02 | 1.8846E−02 | −1.6595E−02 | −1.6710E−02 | −3.2703E−02 | 5.4007E−03 | 2.8267E−02 |
| R8 | −3.6688E+02 | −6.0051E−02 | 1.8862E−02 | −2.7744E−03 | 5.8220E−02 | −2.9022E−02 | −1.9877E−01 | 1.7250E−01 |
| R9 | 2.7424E+00 | −1.5645E−01 | −6.1243E−03 | −1.4799E−02 | −1.2882E−02 | −3.4769E−01 | −6.1231E−02 | 7.0634E−02 |
| R10 | 1.1639E+01 | −6.3511E−02 | 3.4027E−02 | −2.3423E−02 | 7.3218E−03 | 2.4192E−03 | 1.5429E−03 | −1.0185E−03 |
| R11 | 0.0000E+00 | 2.7978E−05 | 7.0849E−03 | −1.3121E−03 | −5.8753E−04 | 1.0550E−04 | 5.2382E−05 | −9.4802E−06 |
| R12 | 1.3317E+00 | −2.7262E−02 | 4.6048E−03 | −1.8392E−03 | 4.1940E−04 | −4.1418E−05 | −1.6459E−05 | 3.7052E−06 |

As shown on Table 5, the Embodiment 2 meets the conditions (1)~(6).

Figure 7:
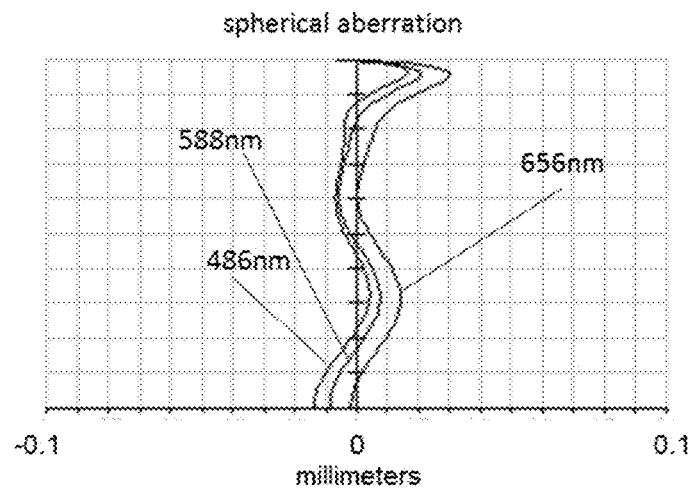
FIG. 7 is spherical aberration diagram of the camera lens LA in Embodiment 2.
Figure 8:
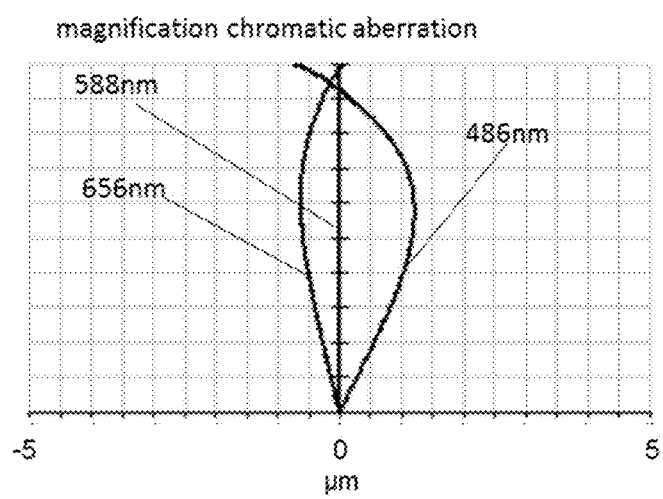
FIG. 8 is a magnification chromatic aberration diagram of the camera lens LA in Embodiment 2.
Figure 9:
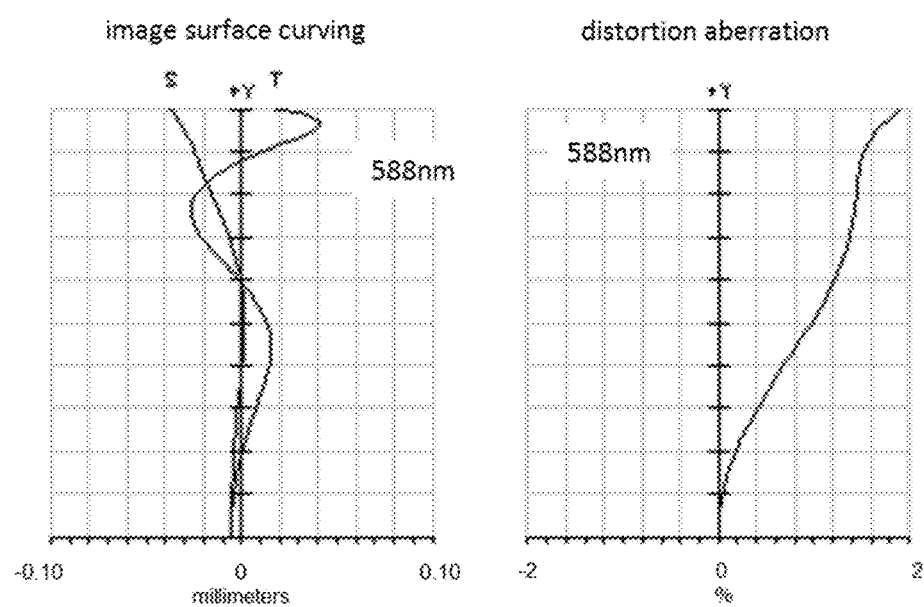
FIG. 9 is an image surface curving diagram and distortion aberration diagram of the camera lens LA in Embodiment 2.

Spherical aberration of camera lens LA in embodiment 2 is shown in FIG. 7, magnification chromatic aberration of the same is shown in FIG. 8, image surface curving and distortion aberration of the same is shown in FIG. 9. As shown in FIG. 3~5, the camera lens LA in embodiment 2 has properties as follows, 2ω=47.5°, TTL=5.373 mm, camera lens is small sized and narrow angle camera lens, it is not difficult to understand why it has excellent optical properties.

The values in all embodiments and the values corresponding to the parameters specified in the conditions (1)~(6) are shown in the Table 5. Furthermore, units of various values in Table 5 are respectively 2ω(°), f (mm), f1 (mm), f2 (mm), f3 (mm), f4 (mm), f5 (mm), f6 (mm), TTL (mm), LB (mm), IH (mm)

TABLE 5

| | Embodiment 1 | Embodiment 2 | Condition |
|---|---|---|---|
| f1/f | 0.448 | 0.448 | 1 |
| (R7 + R8)/(R7 − R8) | −0.304 | −0.307 | 2 |
| f2/f | −0.676 | −0.676 | 3 |
| f3/f | −4.214 | −4.227 | 4 |
| (R1 + R2)/(R1 − R2) | −0.922 | −0.918 | 5 |
| (R11 + R12)/(R11 − R12) | −2.498 | −2.477 | 6 |
| Fno | 2.65 | 2.65 | |
| 2ω | 47.5 | 47.5 | |
| Max CRA | 27.0 | 27.0 | |
| f | 5.827 | 5.832 | |
| f1 | 2.610 | 2.611 | |
| f2 | −3.940 | −3.943 | |
| f3 | −24.553 | −24.651 | |
| f4 | 8.904 | 9.038 | |
| f5 | −8.881 | −8.875 | |
| f6 | −11.510 | −11.494 | |
| TTL | 5.380 | 5.373 | |
| LB | 0.859 | 0.859 | |
| IH | 2.619 | 2.619 | |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera lens comprising, arranged sequentially from an object side to an image side:
    a first lens with positive refractive power;
    a second lens with negative refractive power;
    a third lens with negative refractive power;
    a fourth lens with positive refractive power;
    a fifth lens with negative refractive power;
    and a sixth lens with negative refractive power; wherein the camera lens satisfies the following conditions (1)~(2):

$$0.35 \leq f1/f \leq 0.50 \quad (1)$$

$$-1.00 \leq (R7+R8)/(R7-R8) \leq -0.10 \quad (2)$$

where,
f: overall focal distance of the camera lens;
f1: focal distance of the first lens;
R7: curvature radius of the fourth lens' object side surface;
R8: curvature radius of the fourth lens' image side surface.

2. The camera lens as described in claim 1 further satisfying following condition (3):

$$-1.00 \leq f2/f \leq -0.50 \quad (3)$$

where,
f: overall focal distance of the camera lens;
f2: focal distance of the second lens.

3. The camera lens as described in claim 1 further satisfying following condition (4):

$$-10.00 \leq f3/f \leq -2.00 \quad (4)$$

where,
f: overall focal distance of the camera lens;
f3: focal distance of the third lens.

4. The camera lens as described in claim 1 further satisfying following condition (5):

$$-1.00 \leq (R1+R2)/(R1-R2) \leq -0.80 \qquad (5)$$

where,

R1: curvature radius of the first lens' object side surface;
R2: curvature radius of the first lens' image side surface.

5. The camera lens as described in claim 1 further satisfying following condition (6):

$$-4.00 \leq (R11+R12)/(R11-R12) \leq -1.00 \qquad (1)$$

where,

R11: curvature radius of the sixth lens' object side surface;
R12: curvature radius of the sixth lens' image side surface.

* * * * *